United States Patent
Kauffman et al.

(10) Patent No.: US 10,392,537 B2
(45) Date of Patent: Aug. 27, 2019

(54) PROPYLENE POLYMER-BASED HOT MELT ADHESIVE COMPOSITION EXHIBITING FAST SET TIME AND ARTICLES INCLUDING THE SAME

(71) Applicant: H.B. Fuller Company, St. Paul, MN (US)

(72) Inventors: Thomas F. Kauffman, Woodbury, MN (US); Scott C. Schmidt, Woodbury, MN (US); Kim M. Larson, White Bear Lake, MN (US); Amanda L. Schmit, Wyoming, MN (US); Timothy W. Roska, Lake Elmo, MN (US)

(73) Assignee: H.B. Fuller Company, St. Paul, MN (US)

( * ) Notice: Subject to any disclaimer, the term of this patent is extended or adjusted under 35 U.S.C. 154(b) by 15 days.

(21) Appl. No.: 15/638,866

(22) Filed: Jun. 30, 2017

(65) Prior Publication Data

US 2018/0002578 A1 Jan. 4, 2018

Related U.S. Application Data

(60) Provisional application No. 62/357,584, filed on Jul. 1, 2016, provisional application No. 62/472,315, filed on Mar. 16, 2017.

(51) Int. Cl.

| | |
|---|---|
| *C09J 123/14* | (2006.01) |
| *C09J 9/00* | (2006.01) |
| *C09J 11/08* | (2006.01) |
| *C08L 23/14* | (2006.01) |
| *B32B 7/12* | (2006.01) |
| *C09J 123/08* | (2006.01) |
| *C09J 123/12* | (2006.01) |
| *C08L 23/08* | (2006.01) |
| *C08L 23/12* | (2006.01) |
| *C08L 91/06* | (2006.01) |

(52) U.S. Cl.
CPC ............... *C09J 123/14* (2013.01); *B32B 7/12* (2013.01); *C08L 23/0815* (2013.01); *C08L 23/12* (2013.01); *C08L 23/14* (2013.01); *C08L 91/06* (2013.01); *C09J 9/00* (2013.01); *C09J 11/08* (2013.01); *C09J 123/0815* (2013.01); *C09J 123/12* (2013.01)

(58) Field of Classification Search
CPC .. C09J 123/14; C09J 9/00; C09J 11/08; C08L 23/14; B32B 7/12
USPC ........................................................ 524/515
See application file for complete search history.

(56) References Cited

U.S. PATENT DOCUMENTS

| | | | |
|---|---|---|---|
| 6,107,430 A | 8/2000 | Dubois et al. | |
| 6,365,539 B1 | 4/2002 | Ponasik, Jr. et al. | |
| 6,677,410 B2 | 1/2004 | Williams | |
| 6,747,114 B2 | 6/2004 | karandinos et al. | |
| 7,294,681 B2 | 11/2007 | Jiang et al. | |
| 7,541,402 B2 | 6/2009 | Abhari et al. | |
| 7,550,528 B2 | 6/2009 | Abhari et al. | |
| 7,645,829 B2 | 1/2010 | Tse et al. | |
| 7,700,707 B2 | 4/2010 | Abhari et al. | |
| 8,242,198 B2 | 8/2012 | Jiang et al. | |
| 8,283,400 B2 | 10/2012 | Rodriguez et al. | |
| 8,366,865 B2 | 2/2013 | Terfloth et al. | |
| 8,536,268 B2 | 9/2013 | Karjala et al. | |
| 8,614,271 B2 | 12/2013 | Davis et al. | |
| 8,653,169 B2 | 2/2014 | Abhari et al. | |
| 8,653,199 B2 | 2/2014 | Abhari et al. | |
| 8,921,474 B2 | 12/2014 | Alper et al. | |
| 9,200,185 B2 | 12/2015 | Knutson et al. | |
| 9,267,060 B2 | 2/2016 | Davis et al. | |
| 9,598,615 B2 | 3/2017 | Fujinami et al. | |
| 9,605,185 B2 | 3/2017 | Kobayashi et al. | |
| 9,605,186 B2 | 3/2017 | Tse et al. | |
| 2010/0305259 A1 | 12/2010 | Rodriguez et al. | |
| 2013/0060215 A1 | 3/2013 | Knutson et al. | |
| 2013/0203900 A1 | 8/2013 | Ellis et al. | |
| 2015/0166850 A1 | 6/2015 | Tse et al. | |
| 2015/0174865 A1* | 6/2015 | Hatanaka | B32B 27/32 428/141 |
| 2016/0130480 A1* | 5/2016 | Kauffman | C08L 23/142 428/36.1 |
| 2016/0215176 A1* | 7/2016 | Kanderski | C09J 123/0815 |
| 2016/0230051 A1* | 8/2016 | Kauffman | B32B 5/26 |
| 2019/0376479 | 12/2016 | Bao et al. | |

FOREIGN PATENT DOCUMENTS

| | | |
|---|---|---|
| EP | 0886656 B1 | 9/2001 |
| EP | 2 261 292 A2 | 12/2010 |

(Continued)

OTHER PUBLICATIONS

Eastman Aerafin 180 polymer Technical Data Sheet, May 26, 2015 (2 pages).

(Continued)

*Primary Examiner* — Deve E Valdez
(74) *Attorney, Agent, or Firm* — Kirsten Stone; Allison Johnson

(57) ABSTRACT

A hot melt adhesive composition that includes at least 35% polymer, from about 15% by weight, to no greater than 75% by weight propylene polymer derived from at least 50% by weight propylene and from 0 mole % to about 37.5% by weight of an alpha-olefin comonomer other than propylene, the propylene polymer exhibiting a heat of fusion of from about 5 Joules per gram (J/g) to 60 J/g, from 5% by weight to about 50% by weight ethylene alpha-olefin copolymer derived from at least 50% by weight ethylene and at least one alpha-olefin comonomer having at least three carbon atoms, the ethylene alpha-olefin copolymer having a density of no greater than 0.90 g/cm$^3$, and from 18% by weight to about 37% by weight of a wax component that exhibits a melting point greater than 80° C. and a heat of fusion of at least 200 J/g.

23 Claims, No Drawings

(56) References Cited

FOREIGN PATENT DOCUMENTS

| GB | 1449739 | 9/1976 |
|----|---------|--------|
| WO | WO 2000/050475 | 8/2000 |
| WO | WO2014/105244 | 7/2014 |
| WO | WO 2015/161241 | 10/2015 |
| WO | WO 2016026120 | 2/2016 |
| WO | WO 2016028970 | 2/2016 |
| WO | WO 2016/089851 | 6/2016 |
| WO | WO 2017/017136 | 2/2017 |

OTHER PUBLICATIONS

Eastman Aerafin 180 polymer Sales Specification, Jun. 3, 2015 (1 page).

Bach, Sebastijan "Feica Izmir 2013: C2/C3 Based Metallocene Polymers and Waxes for the Hot Melt Industry," Sep. 2013, 35 pages, Clariant Company, Germany.

Mclennaghan, Allan, et al., "Navigating Formulation Choices for Hot Melt Adhesives—Perspectives from a Global Polyolefin Producer," 2013, pp. 1-25, The Dow Chemical Company.

* cited by examiner

PROPYLENE POLYMER-BASED HOT MELT ADHESIVE COMPOSITION EXHIBITING FAST SET TIME AND ARTICLES INCLUDING THE SAME

CROSS REFERENCE TO RELATED APPLICATIONS

This application claims the benefit of U.S. Provisional Application No. 62/357,584, filed Jul. 1, 2016, and U.S. Provisional Application No. 62/472,315, filed Mar. 16, 2017, both of which are incorporated herein.

BACKGROUND

The invention relates to propylene polymer-based hot melt adhesive compositions.

Hot melt adhesive compositions are often used to bond two substrates together and are applied in a molten state to at least one of the substrates. To be commercially viable, most hot melt adhesive compositions must maintain adhesion to the substrate at room temperature.

For an adhesive composition to be suitable for use in high speed packaging operations, the adhesive must exhibit a fast set time and a fiber tearing bond. It is very difficult to achieve these properties when the hot melt adhesive composition is based on a propylene polymer. Waxes are often used in an attempt to improve set time; however, waxes often have a deleterious effect on adhesion. Polyethylene-based and Fischer Tropsch waxes, for example, tend to be incompatible with propylene-based hot melt adhesive compositions and tend to phase separate from the propylene polymer as the composition cools, which results in poor adhesion.

In the past, hot melt adhesive compositions have been formulated with LINXAR 127 propylene-hexene copolymer, which had been produced by ExxonMobil Chemical Company (Houston, Tex.). However, LINXAR 127 is no longer commercially available. Accordingly, there is a need to formulate hot melt adhesive compositions that are based on propylene polymers other than LINXAR 127, and that exhibit both a fast set, time and good fiber tearing adhesive properties. There is also a need to improve the set time of hot melt adhesive compositions that are based on propylene polymers whether that polymer is LINXAR 127 or another propylene polymer.

SUMMARY

In one aspect, the invention features a hot melt adhesive composition that includes at least 35% by weight polymer, from about 15% by weight to no greater than 75% by weight propylene polymer derived from at least 50% by weight propylene and from about 0 mole % to about 37.5 mole % of an alpha-olefin comonomer other than propylene, the propylene polymer exhibiting a heat of fusion of from about 5 Joules per gram (J/g) to 60 J/g, from 5% by weight to about 50% by weight ethylene alpha-olefin copolymer derived from at least 50% by weight ethylene and at least one alpha-olefin comonomer having at least, three carbon atoms, the ethylene alpha-olefin copolymer having a density of no greater than 0.90 g/cm$^3$, and from 18% by weight to about 37% by weight of a wax component exhibiting a melting point greater than 80° C. and a heat of fusion of at least 200 J/g. In some embodiments, the propylene polymer is a propylene-alpha olefin polymer derived from at least 50% by weight propylene and from about 1 mole % to about 37.5 mole % of an alpha-olefin comonomer. In one embodiment, the hot melt adhesive composition exhibits a set time of no greater than 1.5 seconds at an application temperature of at least 149° C. In one embodiment, the propylene polymer exhibits a melt temperature of no greater than 126° C. In another embodiment, the propylene polymer exhibits a melt temperature of no greater than 120° C. In other embodiments, the propylene polymer exhibits a melt temperature of no greater than 115° C. In still other embodiments, the propylene polymer exhibits a melt, temperature of no greater than 110° C. In other embodiments, the hot melt adhesive composition includes at least 20% by weight propylene polymer.

In some embodiments, the wax is selected from the group consisting of Fischer Tropsch wax, polyethylene wax, and combinations thereof. In one embodiment, the wax component includes at least 15% by weight, based on the weight of the adhesive composition, of a wax that exhibits a melting point greater than 80° C. and a heat of fusion of at least 200 J/g and is selected from the group consisting of Fischer Tropsch wax, polyethylene wax, and combinations thereof. In another embodiment, the hot melt adhesive composition includes from about 25% by weight to about 35% by weight of the wax component.

In another embodiment, the hot melt adhesive composition further includes from about 10% by weight to about 35% by weight tackifying agent.

In other embodiments, the hot melt adhesive composition includes from about 10% by weight, to about 35% by weight of the ethylene alpha-olefin copolymer.

In one embodiment, the hot melt adhesive composition includes from about 15% by weight to about 55% by weight of the propylene polymer, from about 10% by weight to about 32% by weight of the ethylene alpha-olefin copolymer, and from about 19% by weight to about 35% by weight of the wax component, and further includes from about 10% by weight to about 35% by weight tackifying agent.

In another embodiment, the hot melt adhesive composition includes from about 15% by weight to about 50% by weight of the propylene polymer, from about 10% by weight to about 30% by weight of the ethylene alpha-olefin copolymer, and from 25% by weight to about 35% by weight of the wax component, and further includes from about 15% by weight to about 35% by weight tackifying agent.

In some embodiments, the tackifying agent has a Ring and Ball softening point of at least 120° C.

In some embodiments, the hot melt adhesive composition exhibits a specific gravity of no greater than 0.93.

In other embodiments, the hot melt adhesive composition includes from about 15% by weight to about 70% by weight of the propylene polymer, from about 10% by weight to about 35% by weight of the ethylene alpha-olefin copolymer, and from about 19% by weight to about 35% by weight of the wax component.

In another embodiment, the hot melt adhesive composition exhibits a set time of no greater than 1.0 second at an application temperature of at least 135° C. In other embodiments, the hot melt adhesive exhibits a set time of no greater than 0.8 seconds at an application temperature of at least 135° C. In some embodiments, the hot melt adhesive exhibits a set time of no greater than 0.7 seconds at an application temperature of at least 135° C.

In other embodiments, the hot melt adhesive composition exhibits a set time of no greater than 1.5 seconds at an application temperature of at least 177° C. In another embodiment, the hot melt adhesive composition exhibits a set time of no greater than 1 second at an application temperature of at least 177° C. In other embodiments, the hot melt adhesive exhibits a set time of no greater than 0.8 seconds at an application temperature of at least 177° C. In some embodiments, the hot melt adhesive exhibits a set time of no greater than 0.7 seconds at an application temperature of at least 177° C.

In one embodiment, the hot melt adhesive exhibits a peel adhesion failure temperature of at least 50° C. In another embodiment, the hot melt adhesive composition exhibits a peel adhesion failure temperature of at least 55° C.

In some embodiments, the propylene polymer exhibits a Tg no greater than 0° C. In other embodiments, the propylene polymer exhibits a Tg no greater than −25° C. In other embodiments, the propylene polymer exhibits a heat of fusion of from 5 J/g to 55 J/g.

In other embodiments, the hot melt adhesive composition exhibits at least 50% fiber tear at −43° C. and at least 50% fiber tear at 55° C. In one embodiment, the hot melt adhesive composition exhibits at least 50% fiber tear at −18° C.

In another embodiment, the hot melt adhesive composition includes from 10% by weight to 20% by weight of the ethylene alpha-olefin copolymer.

In other aspects, the invention features a hot melt adhesive composition that includes at least 35% by weight polymer, from about 15% by weight to no greater than 75% by weight propylene polymer derived from at least 50% by weight propylene and from 0 mole % to about 37.5 mole % of an alpha-olefin comonomer other than propylene, the propylene polymer exhibiting a heat of fusion of from about 5 J/g to 60 J/g and a melt temperature of no greater than 120° C., from 5% by weight to about 50% by weight ethylene alpha-olefin copolymer derived from at least 50% by weight ethylene and at least one alpha-olefin comonomer having at least three carbon atoms, the ethylene alpha-olefin copolymer having a density of no greater than 0.90 g/cm³, and from at least 15% by weight to about 37% by weight of at least one wax that exhibits a melting point greater than 80° C. and a heat of fusion of at least 200 J/g, where the at least one wax is selected from the group consisting of Fischer Tropsch wax, polyethylene wax, and combinations thereof.

In another aspect, the invention features an article that includes a first substrate, an above-described hot melt adhesive composition, and a second substrate bonded to the first substrate through the adhesive e composition.

The invention features a propylene polymer-based hot melt adhesive composition that includes ethylene alpha-olefin copolymer and that exhibits a fast set time and good fiber tearing adhesive properties.

Other features and advantages will be apparent from the following description of the preferred embodiments and from the claims.

GLOSSARY

In reference to the invention, these terms have the meanings set forth below: The term "wax" as used herein means a polymer or an oligomer having a heat of fusion greater than 60 Joules per gram and a viscosity no greater than 750 centipoise (cP) at 190° C.

The term "metallocene-catalyzed polyethylene wax" refers to a metallocene-catalyzed wax derived from greater than 50% by weight ethylene and optionally at least one comonomer.

DETAILED DESCRIPTION

The hot melt adhesive composition includes at least 35% by weight polymer, a propylene polymer, an ethylene alpha-olefin copolymer, a tackifying agent, and a wax component that exhibits a melting point greater than 80° C. and a heat of fusion of at least 200 J/g. The hot melt adhesive composition exhibits a set time of no greater than 1.5 seconds, no greater than 1 second, no greater than 0.8 seconds, no greater than 0.7 second, or even no greater than 0.6 seconds when tested at an application temperature of at least 120° C., at least 135° C., at least 149° C., or even at least 177° C. The application temperature refers to the temperature of the hot melt adhesive composition at the time it is applied to the test substrate.

The hot melt adhesive composition also exhibits at least 50% at least 70%, at least 80%, or even at least 100% fiber tear at 25° C., 40° C., 50° C., or even 60° C. The hot melt adhesive composition also preferably exhibits at least 50%, at least 70%, at least 80%, or even at least 100% fiber tear at 4° C., −18° C., −29° C., or even −43° C.

The hot melt adhesive composition also preferably has a peel adhesion failure temperature (DAFT) of at least 45° C., at least 50° C., or even at least 55° C. and a shear adhesion failure temperature of (SAFT) of at least 80° C., at least 90° C., or even at least 95° C.

The hot melt adhesive composition also preferably has a specific gravity no greater than 0.97, no greater than 0.96, no greater than 0.95, no greater than 0.94, no greater than 0.93, no greater than 0.925, or even no greater than 0.920.

The hot melt adhesive composition preferably exhibits good thermal stability including, e.g., is free of char, does not gel, is free of sedimentation, and exhibits less than 15% change in viscosity after aging for 200 hours in a molten state, and combinations thereof. The hot melt adhesive composition preferably exhibits a viscosity less than 3000 cps, less than 2500 cps, less than 2000 cps, or even less than 1500 cps at 190° C., at 177° C., or even at 149° C.

The hot melt adhesive composition includes at least 35% by weight, at least 37% by weight, at least 40% by weight, at least 50% by weight, at least 60% by weight, or even at least 70% by weight polymer. The polymer includes the propylene polymer, the ethylene copolymer, and, optionally, additional polymers. The propylene and ethylene copolymers can be produced in a variety of ways including, e.g., independently, as part of a multi-step process, in the same reactor, in multiple reactors, and combinations thereof. The polymers and other components of the hot melt adhesive composition can be combined using a variety of techniques including, e.g., melt blending, solvent blending of at least two components (e.g., propylene copolymer, ethylene copolymer, and wax) followed by isolating the solids from the solvent and melt blending the blend into the final hot melt composition, and combinations thereof.

Propylene Polymer

The propylene polymer is derived from at least 50% by weight propylene and optionally at least one alpha-olefin co-monomer other than propylene (e.g., C2, C4-C20 alpha-olefin co-monomers, and combinations thereof). Useful alpha-olefin co-monomers include, e.g., alpha-olefin monomers having at least two carbon atoms, at least four carbon atoms, from four carbon atoms to eight carbon atoms, and combinations thereof. Examples of suitable classes of alpha-olefin co-monomers include mono-alpha olefins (i.e., one unsaturated double bond) and higher order alpha olefins (e.g., dienes (e.g., 1,9-decadiene)). Suitable alpha-olefin monomers include, e.g., ethylene, butene, pentene, hexene, heptene, octene, nonene, decene, dodecene, 4-methyl-pentene-1,3-methyl pentene-1,3,5,5-trimethyl-hexene-1,5-ethyl-1-nonene, and combinations thereof. Specific examples of suitable propylene-alpha-olefin polymers include propylene-ethylene, propylene-butene, propylene-hexene, propylene-octene, and combinations thereof.

The propylene polymer includes 0 mole %, at least 1 mole %, at least 2 mole %, at least 5 mole %, at least 8 mole %, at least about 10 mole %, no greater than 37.5 mole %, no greater than about 30 mole %, no greater than about 25 mole %, no greater than about 20 mole %, no greater than about 17 mole %, no greater than about 15 mole %, or even no greater than about 10 mole % alpha-olefin co-monomer, and at least 50% by weight, at least about 60% by weight, 100% by weight, no greater than 99% by weight, no greater than 98% by weight, no greater than 95% by weight, no greater than 92% by weight, no greater than 90% by weight, from about 50% by weight to about 92% by weight, from about 60% by weight to about 90% by weight, or even from about 70% by weight to about 90% by weight propylene.

The propylene polymer exhibits a heat of fusion of from about 5 J/g to 60 J/g, from about 5 J/g to about 55 J/g, from about 5 J/g to about 50 J/g, from about 5 J/g to about 45 J/g, or even from about 5 J/g to about 40 J/g. The propylene polymer preferably has density of no greater than 0.90 g/cm$^3$, exhibits a glass transition temperature (Tg) of no greater than about 0° C., no greater than about −5° C., no greater than about −10° C., no greater than about −15° C., or even no greater than about −25° C., and exhibits a melt temperature of no greater than 126° C., no greater than 120° C., no greater than 115° C., no greater than 110° C., or even no greater than 105° C. The propylene polymer also preferably exhibits a viscosity less than 100,000 cps, less than 50,000 cps, or even less than 20,000 cps at 190° C.

Useful propylene polymers include, e.g., homopolymers, copolymers, terpolymers, and higher order polymers, mixtures of at least two different propylene polymers, and combinations thereof. Useful propylene polymers also include, e.g., modified, unmodified, grafted, and ungrafted propylene polymers, uni-modal propylene polymers, multi-modal propylene polymers (e.g., bi-modal propylene polymers), and combinations thereof. The term "multi-modal" means the polymer has a multi-modal molecular weight distribution (weight average molecular weight (Mw)/number average molecular weight (Mn)) as determined by Size Exclusion Chromatography (SEC). A multi-modal molecular weight distribution exists when the SEC trace has more than one peak or inflection point (i.e., two or more inflection points). An inflection point is the point at which the second derivative changes in sign (e.g., from negative to positive or vice versa). The term "uni-modal" means the polymer has a uni-modal molecular weight distribution (Mw/Mn) as determined by SEC. A uni-modal molecular weight distribution exists when the SEC trace has only one peak. Useful multi-modal propylene polymers and methods of making the same are described in WO 2016/089851.

The propylene polymer can be prepared using a variety of catalysts including, e.g., a single site catalyst (e.g., metallocene catalysts (e.g., metallocene-catalyzed propylene polymers)), multiple single site catalysts, non-metallocene heteroaryl catalysts, catalysts described in U.S. Pat. Nos. 6,365,539, 6,677,410, and WO 2000/050475, and combinations thereof. Other suitable polymers include polymers prepared by grafting an amorphous propylene polymer onto a semi-crystalline polymer, examples of which and methods of making the same are disclosed, e.g., in U.S. Pat. No. 7,541,402 (Abhari et al.), and incorporated herein. The propylene polymer can include blocks of isotactic polypropylene and blocks of atactic polypropylene.

Suitable commercially propylene polymers are available under a variety of trade designations including, e.g., the VISTAMAXX series of trade designations from ExxonMobil Chemical Company (Houston, Tex.) including VISTAMAXX 8880 propylene-ethylene copolymer, VISTAMAXX 8780 propylene-ethylene copolymer, and VISTAMAXX 8380 propylene-ethylene copolymer, the LINXAR series of trade designations from ExxonMobil Chemical Company (Houston, Tex.) including LINXAR 127 propylene-hexene copolymer (which is no longer commercially available), the LICOCENE series of trade designations from Clariant Int'l Ltd. (Muttenz, Switzerland) including, e.g., LICOCENE PP 1502 TP, PP 1602 TP, and PP 2602 TP propylene-ethylene copolymers, the AERAFIN series of trade designations from Eastman Chemical Company (Kingsport, Tenn.) including AERAFIN 17 and AERAFIN 180 propylene-ethylene copolymers, and the L-MODU series of trade designations from Idemitsu Kosan Co., Ltd (Japan) including L-MODU S-400 polypropylene homopolymer.

The hot melt adhesive composition includes at least about 15% by weight, at least about 20% by weight, at least about 25% by weight, at least 27% by weight, at least 30% by weight, no greater than 75% by weight, no greater than 70% by weight, no greater than about 65% by weight, no greater than about 55% by weight, no greater than about 50% by weight, no greater than about 45% by weight, no greater than about 40% by weight, no greater than 37.5% by weight, no greater than about 35% by weight, from about 15% by weight to about 70% by weight, from 15% by weight to about 60% by weight, from about 15% by weight to about 55% by weight, from about 15% by weight to about 50% by weight, from about 20% by weight to about 40% by weight, from about 20% by weight to about 37.5% by weight, or even from about 25% by weight to about 35% by weight propylene polymer.

Ethylene Alpha-Olefin Copolymer

The ethylene alpha-olefin copolymer is derived from at least 50% by weight ethylene and at least one alpha-olefin monomer having at least 3 carbon atoms, or even from 3 to 20 carbon atoms. Useful alpha-olefin monomers include, e.g., propylene, isobutylene, butene, pentene, hexene, heptene, octene, nonene, decene, dodecene, 4-methyl-1-pentene, 3-methyl pentene-1,3,5,5-trimethyl-hexene-1,5-ethyl-1-nonene, and combinations thereof. Specific examples of suitable ethylene alpha-olefin copolymers include ethylene-propylene, ethylene-hexene, ethylene-octene, and combinations thereof.

The ethylene alpha-olefin copolymer has a density of at least 0.850 g/cm$^3$, at least 0.855 g/cm$^3$, no greater than 0.90 g/cm$^3$, or even no greater than 0.88 g/cm$^3$ and a melt index greater than 0.5 g/10 minutes, at least 400 g/10 minutes, or even at least 1000 g/10 minutes at 190° C. using a 2.16 kilogram (kg) weight as measured according to ASTM D1238.

Useful commercially ethylene alpha-olefin copolymers are available under of a variety of trade designations including, e.g., the AFFINITY series of trade designations from DowDuPont Chemical Company (Midland, Mich.) including, e.g., AFFINITY GA 1875, AFFINITY GA 1900, AFFINITY GA 1950 ethylene-octene elastomers, and AFFINITY GA 1000R maleic anhydride modified ethylene-octene elastomer, the ENGAGE series of trade designations from DowDuPont Chemical Company (Midland, Mich.) including ENGAGE 8400, ENGAGE 8401, and ENGAGE 8402, the INFUSE series of trade designations from DowDuPont Chemical Company (Midland, Mich.) including INFUSE 9500, the SABIC POE series of trade designations from Saudi Basic Industries Corp. (Pittsfield, Mass.) including SABIC POE C30070D, and the EXACT series of trade designations from ExxonMobil Chemical Company (Houston, Tex.) including, e.g., EXACT 9061.

The hot melt adhesive composition includes at least 5% by weight, at least 5% by weight, at least 20% by weight, from about 5% by weight to about 50% by weight, from about 5% by weight to about 45% by weight, from about 5% by weight to about 40% by weight, from about 5% by weight to about 35% by weight, from about 5% by weight to about 25% by weight, from about 10% by weight to about 35% by weight, from about 10% by weight to about 32% by weight, from about 10% by weight to about 30% by weight, from about 10% by weight to about 25% by weight, from about 10% by weight to about 20% by weight, from about 12% by weight to about 20% by weight, or even from about 12% by weight to about 18% by weight ethylene alpha-olefin copolymer.

Wax Component

The wax component exhibits a melting point of greater than 80° C., at least 100° C., or even at least 115° C., and a heat of fusion of at least 200 J/g. The term "wax component" refers to all of the waxes present in the adhesive composition. The wax component includes a polyethylene wax (e.g., metallocene-catalyzed polyethylene wax), a Fischer Tropsch, or a combination thereof, that exhibits a melting point of greater than 80° C., at least 100° C., or even at least 115° C., and a heat of fusion of at least 200 J/g. Where more than one wax is present in the adhesive composition, a uniform melt blend of the waxes (i.e., the wax component) exhibits a melting point of greater than 80° C. and a heat of fusion of at least 200 J/g. The hot melt adhesive composition includes at least 18% by weight, at least 19% by weight, at least 20% by weight, no greater than 37% by weight, no greater than about 35% by weight, from 18% by weight to about 37% by weight, from about 19% by weight to about 35% by weight, from about 20% by weight to about 37% by weight, from about 25% by weight to about 37% by weight, or even from about 25% by weight to about 35% by weight of the wax component.

At least 15% by weight, at least 18% by weight, at least 19% by weight, at least 20% by weight, no greater than 37% by weight, no greater than about 35% by weight, from about 20% by weight, to about 37% by weight, from about 25% by weight to about 37% by weight, or even from about 25% by weight to about 35% by weight of the adhesive composition is a wax that exhibits a melting point of greater than 80° C. and a heat of fusion of at least 200 J/g, and is polyethylene wax (e.g., metallocene-catalyzed polyethylene wax), Fischer Tropsch wax, or a combination thereof.

Useful polyethylene waxes that exhibit a melting point of greater than 80° C. and a heat of fusion of at least 200 J/g are commercially available under a variety of trade designations including, e.g., the EPOLENE series of trade designations from Westlake Chemical Corporation (Houston, Tex.) including, e.g., EPOLENE N-21 and N-14 polyethylene waxes, the BARECO series of trade designations from Baker Hughes Inc. (Sugar Land, Tex.) including, e.g., BARECO C4040 polyethylene wax, the AC series of trade designations from Honeywell Int'l Inc. (Morristown, N.J.) including, e.g., A-C 8 and A-C 9 polyethylene waxes, the POLYWAX series of trade designations including POLYWAX 3000, 500, 1500, and 2000 polyethylene waxes from Baker Hughes (Houston, Tex.), MARCUS 200 from Marcus Oil and Chemical (Houston, Tex.), and CWP 400 polyethylene wax from SSI CHUSEI, Inc. (Pasedena, Tex.).

Useful Fischer Tropsch waxes that exhibit a melting point of greater than 80° C. and a heat of fusion of at least 200 j/g are commercially available under a variety of trade designations including, e.g., the BARECO series of trade designations from Baker Hughes Inc. (Sugar Land, Tex.) including, e.g., BARECO PX-100 and PX-105 Fischer Tropsch waxes, the SHELLWAX and SARAWAX-SX-105 series of trade designations from Shell Malaysia Ltd. (Kuala Lumpur, Malaysia) including, e.g., SHELLWAX SX100 and SX105 and SARAWAXSX100 and SX105 Fischer Tropsch waxes, the VESTOWAX series of trade designations from Evonik Industries AG (Germany) including, e.g., VESTOWAX 2050 Fischer Tropsch wax, and the SASOLWAX series of trade designations from Sasol Wax North America Corporation (Hayward, Calif.) including, e.g., SASOLWAX H105, C80, H1, and H4 Fischer Tropsch waxes.

The wax component optionally includes wax that exhibits a melting point of less than 80° C., wax that exhibits a heat of fusion less than 200 J/g, functionalized wax, propylene wax (e.g., polypropylene homopolymer wax and propylene copolymer wax), and combinations thereof. Classes of waxes that include waxes that exhibit a melting point of no greater than 80° C., a heat of fusion of less than 200 J/g, or a combination of such properties include, e.g., paraffin waxes, microcrystalline waxes, polyethylene waxes, and synthetic waxes. Suitable commercially available examples of these optional waxes are available under a variety of trade designations including, e.g., LICOCENE PE520 polyethylene wax from Clariant, MICROSERE 195 microcrystalline wax from Ruger Chemical Co., Ltd., (Irvington, Pa.), FR-6513 paraffin wax from Calumet Specialty Products Partners LP (Indianapolis, Ind.), and Shell SARAWAX-SX-70 Fischer Tropsch wax from Shell Malyasia Ltd. (Kuala Lampure, Malaysia).

The wax component optionally includes from 0% by weight to no greater than 30% by weight (based on the weight of the wax component) of a wax that exhibits a melting point no greater than 80° C., a heat of fusion less than 200 J/g, or a combination of such properties.

Suitable functionalized waxes include, e.g., functionalized polypropylene wax (e.g., maleated polypropylene wax and oxidized polypropylene wax), functionalized polyethylene wax (e.g., maleated polyethylene wax and oxidized polyethylene wax), and combinations thereof. Suitable commercially available examples of functionalized waxes are available under a variety of trade designations including, e.g., AC-596 maleic anhydride grafted propylene copolymer from Honeywell (Morris Plains, N.J.), E43 maleic anhydride grafted polypropylene from Westlake Chemical Corporation (Houston, Tex.), and LICOCENE PP MA 1332 TP from Clariant MCI Ltd. (Muttenz, Switzerland).

Examples of commercially available propylene waxes include, e.g., metallocene-catalyzed polypropylene waxes available under the LICOCENE series of trade designations from Clariant Intl Ltd. (Muttenz, Switzerland) including, e.g., LICOCENE PP 6102, LICOCENE PP 6502, and LICOCENE PP 7502.

The hot melt adhesive composition optionally includes from about 0% by weight to no greater than 10% by weight, from about 1% by weight to no greater than 10% by weight, from about 0.2% by weight to about 5% by weight, from about 1% by weight to about 4% by weight, from about 2% by weight to about 3.5% by weight, no greater than 2% by weight, or even no greater than 1% by weight functionalized wax, propylene wax, or a combination thereof.

Tackifying Agent

The tackifying agent exhibits a Tg of no greater than 90° C., no greater than 80° C., no greater than 70° C., no greater than 60° C., or even no greater than 50° C., and a Ring and Ball softening point of less than about 160° C., as determined by ASTM method E28-58T. The tackifying agent preferably exhibits a Ring and Ball softening point of at least 120° C., or even at least 125° C. Suitable classes of tackifying agents include, aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin, and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, phenolic-modified pentaerythritol esters of rosin, and combinations thereof. Examples of useful polyterpene resins include polyterpene resins having a softening point, as determined by ASTM method E28-58T, of from about 10° C. to about 160° C., hydrogenated polyterpene resins, and copolymers and terpolymers of natural terpenes (e.g. styrene-terpene, alpha-methyl styrene-terpene and vinyl toluene-terpene), and combinations thereof. Examples of useful aliphatic and cycloaliphatic petroleum hydrocarbon resins include aliphatic and cycloaliphatic petroleum hydrocarbon resins having Ring and Ball softening points of from about 10° C. to 160° C., the hydrogenated derivatives thereof, and combinations thereof. Suitable aliphatic and cycloaliphatic petroleum hydrocarbon resins include, e.g., branched, unbranched, and cyclic C5 resins, C9 resins, and C10 resins.

Useful tackifying agents are commercially available under a variety of trade designations including, e.g., the ESCOREZ series of trade designations from ExxonMobil Chemical Company (Houston, Tex.) including, e.g., ESCOREZ 1310LC, ESCOREZ 5400, ESCOREZ 5637, ESCOREZ 5415; ESCOREZ 5600, ESCOREZ 5615; and ESCOREZ 5690, the EASTOTAC series of trade designations from Eastman Chemical Company (Kingsport, Tenn.) including, e.g., EASTOTAC H-100R, EASTOTAC H-100L, and EASTOTAC H130W, the WINGTACK series of trade designations from Cray Valley HSC (Exton, Pa.) including, e.g., WINGTACK 86, WINGTACK EXTRA, and WINGTACK 95, the PICCOTAC series of trade designations from Eastman Chemical Company (Kingsport, Tenn.) including, e.g., PICCOTAC 8095 and 1115, the ARKON series of trade designations from Arkawa Europe GmbH (Germany) including, e.g., ARKON P-125, the REGALITE and REGALREZ series of trade designations from Eastman Chemical Company including, e.g., REGALITE R1125 and REGALREZ 1126, and the RESINALL series of trade designations from Resinall Corp (Severn, N.C.) including RESINALL R1030.

Useful tackifying agents that are liquid at room temperature (i.e., from about 20° C. to about 25° C.) include, e.g., REGALREZ 1018 hydrocarbon resin from Eastman Chemical Company, PICCOLASTIC A5 hydrocarbon resin from Eastman Chemical Company, and WINGTACK 10 from Cray Valley (Exton, Pa.).

The hot melt adhesive composition includes from 0% by weight to no greater than about 40% by weight, at least about 10% by weight, at least about 15% by weight, at least about 20% by weight, at least about 22% by weight, no greater than about 40% by weight, no greater than about 35% by weight, no greater than about 30% by weight, from about 20% by weight to about 35% by weight, from about 20% by weight to about 30% by weight, or even from about 20% by weight to about 25% by weight tackifying agent.

Additives

The hot melt adhesive composition optionally includes a variety of additional components including, e.g., antioxidants, stabilizers, additional polymers, adhesion promoters, ultraviolet light stabilizers, rheology modifiers, corrosion inhibitors, colorants (e.g., pigments and dyes), fillers, flame retardants, nucleating agents, and combinations thereof.

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants, and IRGAFOS 168 phosphite antioxidant, all of which are available from BASF Corporation (Florham Park, N.J.), and ETHYL 702 4,4'-methylene bis(2,6-di-tert-butylphenol), which is available from Albemarle Corporation (Baton Rouge, La.) When present, the adhesive composition preferably includes from about 0.1% by weight to about 2% by weight antioxidant.

Useful additional polymers include, e.g., homopolymers, copolymers, and terpolymers, thermoplastic polymers including, e.g., other polyolefins (e.g., high viscosity polyolefins (e.g., high viscosity propylene and ethylene polymers), (e.g., amorphous propylene and ethylene polymers), and combinations thereof), elastomers including, e.g., elastomeric block copolymers (e.g., elastomeric block copolymers that includes styrene (e.g., styrene-butadiene-styrene, styrene-isoprene-styrene, styrene-ethylene/butene-styrene, styrene-ethylene/propylene-styrene and combinations thereof), metallocene-based elastomeric block copolymers, and combinations thereof), and functionalized versions thereof, and combinations thereof.

Uses

The hot melt adhesive composition can be applied to or incorporated in a variety of articles including, e.g., fibers, substrates made from fibers (e.g., virgin fibers, recycled fibers, synthetic polymer fibers (e.g., nylon, rayon, polyesters, acrylics, polypropylenes, polyethylene, polyvinyl chloride, polyurethane), cellulose fibers (e.g., natural cellulose fibers such as wood pulp), natural fibers (e.g., cotton, silk and wool), and glass fibers, and combinations thereof), release liners, porous substrates, cellulose substrates, sheets (e.g., paper, and fiber sheets), paper products, woven and nonwoven webs (e.g., webs made from fibers (e.g., yarn, thread, filaments, microfibers, blown fibers, and spun fibers) perforated films, and combinations thereof), tape backings, and combinations thereof.

The hot melt adhesive composition is useful for bonding a variety of substrates including, e.g., cardboard, coated cardboard, paperboard, fiber board, virgin and recycled kraft, high and low density kraft, chipboard, treated and coated kraft and chipboard, and corrugated versions of the same, clay coated chipboard carton stock, composites, leather, fibers and substrates made from fibers (e.g., virgin fibers, recycled fibers, synthetic polymer fibers, cellulose fibers, and combinations thereof), release liners, porous substrates (e.g., woven webs, nonwoven webs, and perforated films), cellulose substrates, sheets (e.g., paper, and fiber sheets), paper products, tape backings, and combinations thereof.

The hot melt adhesive composition is useful for bonding a first substrate to a second substrate in a variety of applications and constructions including, packaging, bags, boxes, cartons, cases, trays, multi-wall bags, articles that include attachments (e.g., straws attached to drink boxes), ream wrap, cigarettes (e.g., plug wrap), filters (e.g., pleated filters and filter frames), bookbinding, paper products including, e.g., paper towels (e.g., multiple use towels), toilet paper, facial tissue, wipes, tissues, towels (e.g., paper towels), and combinations thereof.

The hot melt adhesive composition can be applied to a substrate in any useful form including, e.g., as a coating (e.g., a continuous coatings and discontinuous coatings (e.g., random, pattern, and array)), as a bead, as a film (e.g., a continuous films and discontinuous films), and combinations thereof, using any suitable application method including, e.g., slot coating, spray coating (e.g., spiral spray, random spraying, and random fiberization (e.g., melt blowing), foaming, extrusion (e.g., applying a bead, fine line extrusion, single screw extrusion, and twin screw extrusion), wheel application, noncontact coating, contacting coating, gravure, engraved roller, roll coating, transfer coating, screen printing, flexographic, "on demand" application methods, and combinations thereof.

In on demand hot melt application systems (which are also referred to as "tank free" and "tankless" systems), hot melt compositions are fed in a solid state (e.g., pellets), to a relatively small heating vessel (relative to traditional hot melt applications systems that include a pot) where the hot melt composition is melted and, typically shortly thereafter, the molten liquid is applied to a substrate. In on demand systems, a relatively large quantity of hot melt composition typically does not remain in a molten state for an extended period of time. In many existing on demand systems, the volume of molten hot melt composition is no greater than about 1 liter, or even no greater than about 500 milliliters, and the hot melt composition is maintained in a molten state for a relatively brief period of time, including, e.g., less than two hours, less than one hour, or even less than 30 minutes. Suitable on demand hot melt adhesive application systems include, e.g., InvisiPac Tank-Free Hot Melt Delivery System from Graco Minnesota Inc. (Minneapolis, Minn.) and the Freedom Hot Melt Dispensing System from Nordson Corporation (Westlake, Ohio). On demand hot melt adhesive application systems are described in U.S. Patent Publication Nos. 2013-0105039, 2013-0112709, 2013-0112279, and 2014-0042182, and U.S. Pat. No. 8,201,717, and incorporated herein.

The invention will now be described by way of the following examples. All parts, ratios, percentages and amounts stated in the Example Section are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) and ambient humidity (i.e., from 30% to 70%) unless otherwise specified.

Specific Gravity

Specific gravity is determined according to ASTM D792-91.

Viscosity Test Method

Viscosity is determined in accordance with ASTM D-3236 entitled, "Standard Test Method for Apparent viscosity of Hot Melt Adhesives and Coating Materials," (Oct. 31, 1988), using a Brookfield viscometer, a Brookfield Thermosel heated sample chamber, and a number 27 spindle. The results are reported in centipoise (cP).

Set Time Test Method

A bead of adhesive composition measuring 5.08 cm by 0.24 cm is applied to a first substrate of WESTROCK 44 pound ECT 100% recycled content liner board using a MEC ASM-15N Hot Melt Bond Simulator. The temperature of the adhesive composition when it is applied to the substrate is referred to the application temperature. The application temperature is 177° C. unless otherwise specified. Two seconds after the bead of adhesive is applied to the first substrate, the bead of adhesive is contacted with the second substrate of WESTROCK 44 pound ECT 100% recycled content liner board, which is then pressed against the first substrate with a pressure of 0.21 MPa and for a period of time (referred to herein as the compression time). The Bond Simulator timer is started when the substrates are compressed. After a pre-programmed compression time the instrument separates the two substrates by pulling on the second substrate in the Z direction and holding the first substrate in a fixed position and the force required to separate the substrates and the amount of fiber tear present on the adhesive composition is measured. Samples are run in triplicate at each compression time. Initially, the compression time is 0.5 seconds. If the three samples fail to exhibit greater than 50% Fiber Tear for each sample, the compression time is increased by 0.1 second and the test method is repeated until greater than 50% fiber tear is noted for all three samples. The set time is recorded as the compression time at which the three samples achieve greater than 50% fiber tear immediately upon separation. The set time is recorded in seconds (sec).

Peel Adhesion Failure Test Method

Peel adhesion failure temperature ("PAFT") is tested according to the standard PAFT test in ASTM D-4498, except that the thickness of the test piece sandwich is 10 mils +/−2 mils, the oven temperature is increased automatically at a temperature increase of 25° C./hour rather than manually, and a 100 gram weight is used.

Shear Adhesion Failure Temperature (SAFT)

Shear adhesion failure temperature ("SAFT") is tested according to the standard SAFT test in ASTM D-4498, except that the thickness of the test piece sandwich is 10 mils +/−2 mils, the oven temperature is increased automatically at a temperature increase of 25° C./hour rather than manually, and a 500 gram weight is used.

Fiber Tear Test Method

The percentage fiber tear is the percentage of fiber that covers the area of the adhesive after two substrates, which have been previously bonded together through the adhesive, are separated by force. The percentage of fiber tear exhibited by an adhesive composition is determined as follows. A bead of the adhesive composition measuring 15.24 cm (6 inch)× 0.24 cm (3/32 inch) is applied to a first substrate of INTERNATIONAL PAPER 32 pound ECT 100% Recycled Content liner board, using a ROCKTENN bond simulator at the specified application temperature. Two seconds after the bead of adhesive is applied to the first substrate, the bead of adhesive is contacted with a second substrate of INTER- NATIONAL PAPER 32 pound ECT 100% Recycled Content liner board, which is pressed against the adhesive and the first substrate with a pressure of 0.21 MPa (30 pounds per square inch (psi)) for a period of 2 seconds. The resulting constructions are then conditioned at room temperature for at least 4 hours and then conditioned at the specified test temperature for at least 12 hours. The substrates of the construction are then separated from one another at the conditioning temperature (e.g., immediately after removing the sample from the conditioning chamber) by pulling the two substrates apart from one another by hand. The surface of the adhesive composition is observed and the percent of the surface area of the adhesive composition that is covered by fibers is determined and recorded A minimum of five samples are prepared and tested for each hot melt adhesive composition. The results are reported in units of % fiber tear.

Thermal Stability Test Method

A 200 gram sample of hot melt adhesive composition is placed in a glass beaker (uncovered) and conditioned in a temperature controlled, forced air oven at 177° C. for 200 hours. The molten sample is removed from the oven. The molten sample is observed for the presence of gel, surface skin formation, and charring. The observations are recorded.

The sample is then tested according to the Viscosity test method and the measured viscosity is reported in centipoise.

Thermal stability is determined by change in viscosity and the presence or absence of charring or skinning.

Melting Point Test Method

The melting point is determined according to ASTM D-3461 entitled, "Standard Test Method for Softening Point of Asphalt and Pitch (Mettler Cup and Ball Method)" with a heating rate of 2° C. per minute.

Differential Scanning Calorimetry (DSC) Test Method for Tg, Melt Temperature (Tm) and Heat of Fusion A 7.25 mg ±0.25 mg sample is placed into a pan specific to the machine being used (e.g., TA Q2000 DSC V24.11 with standard aluminum pans and lids). The sample is then covered with a specified lid and closed. A pan and lid containing no material are also closed and used as a reference sample. The sample is then loaded into the differential calorimeter posts and covered with a nitrogen blanket. The sample is then heated at a rate of 60° C. until the sample reaches 190° C. The sample is then put into an isothermal state for 5 minutes at 190° C. The sample is then cooled at a rate of 10° C. per minute until the sample reaches a temperature of −80° C. Then the sample is again put into an isothermal state for 5 minutes at −80° C. The sample is then heated at 10° C. per minute until the sample reaches 190° C. The resulting data is represented in graphical exothermal down format containing Heat Flow versus Temperature. The glass transition temperature (Tg) is taken during the second melt and is reported. The Tm (melting temperature) is taken as the peak of the greatest magnitude during the second melt and is reported in 0° C. The heat of fusion (Hfus) is taken during the second melt and is reported in Joules per gram (J/g).

Control Examples C1-C4

Control Examples C1-C4 were prepared by combining the ingredients in the amounts (in % by weight) specified in Tables 1 and 2 and heating the same to from 175° C. to 190° C. with mixing.

Control Examples C1-C4 were then tested according to the Viscosity, Set Time, and % Fiber Tear test methods, with the exception that the substrate for the % Fiber Tear test method was WESTROCK 44 pound ECT 100% recycled content liner board instead of International Paper 32 pound ECT 100% recycled content liner board. The application temperature for the Set Time Test Method was 177° C. The results are reported in Tables 1 and 2.

TABLE 1

| Control Example | C1 | C2 |
|---|---|---|
| VISTAMAXX 8380[1] | 30 | 40 |
| AFFINITY GA-1900[2] | 0 | 0 |
| EASTOTAC H-130R[3] | 35 | 35 |
| SASOLWAX H-1[4] | 35 | 25 |
| Viscosity at 177° C. (cP) | 308 | 750 |
| Observations | Very Brittle | Brittle |
| Set Time at 177° C. (sec) | 0.5 | 0.6 |
| % Fiber Tear | | |
| 24° C. | 0 | 0 |
| 4° C. | 0 | 0 |

[1]= VISTAMAXX 8380 metallocene-catalyzed polypropylene elastomer (ExxonMobil)
[2]= AFFINITY GA-1900 ethylene-octene copolymer (DowDuPont Chemicals Company, Midland, Michigan)
[3]= EASTOTAC H-130R hydrogenated hydrocarbon tackifying resin (Eastman Chemical Company (Kingsport, Tennessee)
[4]= SASOLWAX H-1 Fischer Tropsch wax (Sasolwax North America, Hayward, California)

TABLE 2

| Control Example | C3 | C4 |
|---|---|---|
| VISTAMAXX 8880[5] | 40 | 40 |
| EPOLENE C-15 (LDPE)[6] | 10 | 10 |
| SX-105[7] | 9 | 15 |
| EPOLENE N-21[8] | 13 | 7 |
| ESCOREZ 5637[9] | 27.5 | 27.5 |
| IRGANOX 1010[10] | 0.5 | 0.5 |
| Viscosity at 177° C. (cP) | 480 | 398 |
| Observations | Brittle | Brittle |
| Set Time at 177° C. (sec) | 0.8 sec | 0.6 sec |
| % Fiber Tear | | |
| −18° C. | 0 | 0 |
| 4° C. | 0 | 0 |

[5]= VISTAMAXX 8880 metallocene-catalyzed propylene-ethylene copolymer (ExxonMobil Chemical Company, Houston, Texas)
[6]= EPOLENE C-15 low density polyethylene having a density of 0.906 g/cm³ (Westlake Chemical Corporation, Houston, Texas)
[7]= SX-105 Fischer Tropsch wax (Shell Malaysia Ltd., Kuala Lumpur, Malaysia)
[8]= EPOLENE N-21 polyethylene wax (Westlake Chemical Corporation, Houston, Texas)
[9]= ESCOREZ 5637 aromatic modified cycloaliphatic hydrocarbon resin (ExxonMobil)
[10]= IRGANOX 1010 hindered phenolic antioxidant (BASF Corporation, Florham Park, New Jersey)

Examples E1-E3 and Control Examples C5-C10

Examples E1-E3 and Control Examples C5-C10 were prepared by combining the ingredients in the amounts (in % by weight) specified in Table 3 and heating the same to from 175° C. to 190° C. with mixing.

Examples E1-E3 and Control Examples C5-C10 were then tested according to the PAFT, SAFT, Viscosity, Set Time, and % Fiber Tear test methods, with the exception that the viscosity was measured at 177° C. and 149° C., where indicated, and the Set Time was measured at an application temperature of 177° C. and 149° C., where indicated. The results are reported in Table 3.

TABLE 3

|  | E1 | E2 | C5 | C6 | C7 | C8 | C9 | C10 | E3 |
|---|---|---|---|---|---|---|---|---|---|
| VISTAMAXX 8380 | 30 | 0 | 0 | 45 | 30 | 30 | 25 | 25 | 34 |
| AERAFIN 180[11] | 0 | 30 | 45 | 0 | 0 | 0 | 0 | 0 | 0 |
| GA-1875[12] | 15 | 15 | 0 | 0 | 15 | 15 | 20 | 20 | 0 |
| GA-1950[13] | 0 | 0 | 0 | 0 | 0 | 0 | 0 | 0 | 20 |
| ESCOREZ 5637 | 22.5 | 22.5 | 22.5 | 22.5 | 22.5 | 22.5 | 22.5 | 22.5 | 22.5 |
| SX-105 | 32 | 32 | 32 | 32 | 20 | 10 | 20 | 10 | 10 |
| FR-6513[14] | 0 | 0 | 0 | 0 | 12 | 22 | 12 | 22 | 0 |
| EPOLENE N21 | 0 | 0 | 0 | 0 | 0 | 0 | 0 | 0 | 13 |
| IRGANOX 1010 | 0.5 | 0.5 | 0.5 | 0.5 | 0.5 | 0.5 | 0.5 | 0.5 | 0.5 |
| Viscosity at 177° C. (cP) | 798 | 1205 | 1690 | 730 | NT | NT | NT | NT | 1155 |
| Viscosity at 149° C. (cP) | NT | NT | NT | NT | 1222 | 1065 | 1183 | 1038 | NT |
| Set Time at 177° C. (secs) | 0.6 | 0.7 | 1.6 | 1.0 | NT | NT | NT | NT | 1.0 |
| Set Time at 149° C. (secs) | NT | NT | NT | NT | 2.5 | >3.0 | 2.5 | >3.0 | NT |
| PAFT (° C.) | 53.1 | 45.2 | 36.1 | 42.8 | NT | NT | NT | NT | 60.5 |
| SAFT (° C.) | 98.3 | 96.1 | 102.2 | 99.4 | NT | NT | NT | NT | 106.7 |
| % Fiber Tear | | | | | | | | | |
| −43° C. | 99 | 96 | 58 | 1 | NT | NT | NT | NT | NT |
| −29° C. | 96 | 96 | 38 | 0 | NT | NT | NT | NT | NT |
| −18° C. | 92 | 100 | 42 | 0 | NT | NT | NT | NT | NT |
| 4° C. | 98 | 96 | 65 | 0 | NT | NT | NT | NT | 70* |
| 24° C. | 98 | 100 | 78 | 9 | NT | NT | NT | NT | 93* |
| 54° C. | 100 | 92 | 98 | 86 | NT | NT | NT | NT | NT |
| 60° C. | 100 | 72 | 85 | 91 | NT | NT | NT | NT | NT |

[11]AERAFIN 180 propylene-alpha olefin copolymer (Eastman Chemical Company)
[12]AFFINITY GA-1875 ethylene-octene copolymer (DowDuPont)
[13]AFFINITY GA-1950 ethylene-octene copolymer (DowDuPont)
[14]FR-6513 paraffin wax (Calumet Specialty Products Partners, LP, Indianapolis, Indiana)
NT = Not Tested
*The Percent Fiber Tear for these samples was obtained using WESTROCK 44 pound ECT 100% recycled content liner board.

Examples E4-E9

Examples E4-E9 were prepared by combining the ingredients in the amounts (in % by weight) specified in Table 4 and heating the same to from 175° C. to 190° C. with mixing. Examples E4-E9 were then tested according to the Viscosity, Set Time, and % Fiber Tear test methods, with the exception that the viscosity was measured at 177° C. and 135° C., where indicated, and the Set Time was measured at an application temperature of 177° C. and 135° C., where indicated. The results are reported in Table 4.

TABLE 4

|  | E4 | E5 | E6 | E7 | E8 | E9 |
|---|---|---|---|---|---|---|
| AERAFIN 180 | 30 | 25 | 35 | 0 | 0 | 0 |
| VISTAMAXX 8380 | 0 | 0 | 0 | 0 | 30 | 25 |
| VISTAMAXX 8780 | 10 | 10 | 0 | 25 | 0 | 0 |
| GA-1875 | 5 | 10 | 10 | 20 | 0 | 0 |
| GA-1950[14] | 0 | 0 | 0 | 0 | 15 | 18 |
| ESCOREZ 5637 | 22.4 | 22.4 | 22.4 | 22.5 | 22.5 | 22.4 |
| SX-105 | 32 | 32 | 32 | 0 | 32 | 34 |
| G-80[16] | 0 | 0 | 0 | 32 | 0 | 0 |
| IRGANOX 1010 | 0.2 | 0.2 | 0.2 | 0.5 | 0.2 | 0.4 |
| IRGANOX 1076[17] | 0.4 | 0.4 | 0.4 | 0 | 0.3 | 0.2 |
| Viscosity at 177° C. (cP) | 1053 | 962 | 1197 | NT | 915 | 810 |
| Viscosity at 135° C. (cP) | NT | NT | NT | 1212 | NT | NT |
| Set Time at 177° C. (secs) | 0.9 | 0.7 | 0.7 | NT | 0.8 | 0.6 |
| Set Time at 135° C. (secs) | NT | NT | NT | 0.9** | NT | NT |
| % Fiber Tear[18] | | | | | | |
| RT 24° C. | 65 | 86 | 80 | 89** | 66 | 92 |
| % Fiber Tear[19] | | | | | | |
| −43° C. | 100 | 98 | 99 | NT | 96 | 96 |
| −29° C. | 99 | 98 | 98 | 68** | 97 | 99 |
| −18° C. | 98 | 92 | 97 | 59** | 79 | 97 |
| 4° C. | 100 | 99 | 100 | 98** | 96 | 97 |
| 24° C. | 97 | 100 | 100 | 100** | 98 | 95 |
| 49° C. | NT | NT | NT | NT | 90 | 81 |
| 54° C. | 100 | 100 | 100 | 100** | 87 | 87 |
| 60° C. | 100 | 94 | 100 | NT | 90 | 73 |

**the adhesive composition was at a temperature of 135° C. when applied to the test substrate.
[16]C80 Fischer Tropsch wax (Sasol Wax North America Corporation (Hayward, California)
[17]IRGANOX 1076 hindered phenolic antioxidant (BASF Corporation, Florham Park, New Jersey)
[18]The Percent Fiber Tear for these samples was obtained using 44# ECT Westrock
[19]The Percent Fiber Tear for these samples was obtained using 32# ECT International Paper Control C11 and Example E10

Control C11 and Example E10 were prepared by combining the ingredients in the amounts (in % by weight) specified in Table 5 and heating the same to from 175° C., to 190° C. with mixing.

Control C11 and Example E10 were then tested according to the Viscosity, Set Time, and % Fiber Tear test methods. The results are reported in Table 5.

TABLE 5

| Sample | C11 | E10 |
|---|---|---|
| VISTAMAXX 8380 | 20 | 25 |
| AFFINITY GA-1900 | 10 | 15 |
| EASTOTAC H-130R | 35 | 35 |
| SASOLWAX H-1 | 35 | 25 |
| Viscosity at 177° C. (cP) | 290 | 707 |
| Observations | Not Brittle | Not Brittle |
| Set Time at 177° C. (sec) | 0.4 | 0.5 |
| % Fiber Tear at 24° C. | 0 | 76 |
| % Fiber Tear at 4° C. | 0 | 58 |

Control Example C12 and Examples E11-E14

Control Example C12 and Examples E11-E14 were prepared by combining the ingredients in the amounts (in % by weight) specified in Table 6 and heating the same to from 175° C. to 190° C. with mixing.

Control Example C12 and Examples E11-E14 were then tested according to the Set Time test method. The results are reported in Table 6.

Molten blends of the waxes that were present in C12 and Examples E11-E14 were prepared and the Melt Temperature (Tm) and Heat of Fusion (HFus) were measured according to the DSC test method. The results are reported in Table 6.

TABLE 6

| | C12 | E11 | E12 | E13 | E14 |
|---|---|---|---|---|---|
| LICOCENE PP 2602[21] | 37 | 0 | 0 | 0 | 0 |
| LICOCENE PE 4201[22] | 3 | 0 | 0 | 0 | 0 |
| LICOWAX PE 520[23] | 20 | 0 | 0 | 0 | 0 |
| SUKOREZ SU 90[24] | 40 | 0 | 0 | 0 | 0 |
| VISTAMAXX 8380 | 0 | 30 | 30 | 30 | 30 |
| AFFINITY GA-1950 | 0 | 15 | 15 | 15 | 15 |
| ESCOREZ 5637 | 0 | 22.4 | 22.4 | 22.4 | 22.4 |
| SX-105 | 0 | 24 | 24 | 24 | 28 |
| CWP 400[25] | 0 | 8 | 0 | 0 | 0 |
| MARCUS 200[26] | 0 | 0 | 8 | 0 | 0 |
| MICROSERE 195[27] | 0 | 0 | 0 | 8 | 0 |
| FR-6513[28] | 0 | 0 | 0 | 0 | 4 |
| IRGANOX 1076 | 0 | 0.4 | 0.4 | 0.4 | 0.4 |
| IRGANOX 1010 | 0 | 0.2 | 0.2 | 0.2 | 0.2 |
| Set Time (seconds) at 177° C. | >1.5 | 0.8 | 0.7 | 0.8 | 0.8 |
| Properties of a melt blend of the Wax Component | | | | | |
| Tm (° C.) | 112 | 97 | 95 | 114 | 95 |
| HFus (J/g) | 174.1 | 269.8 | 270.2 | 263.1 | 268.3 |

[21] = LICOCENE PP 2602 metallocene propylene-ethylene copolymer Clariant Int'l Ltd., Muttenz, Switzerland)
[22] = LICOCENE PE 4201 metallocene polyethylene wax having a heat of fusion of 254 J/g and a melting point of 123° C. (Clariant)
[23] = LICOWAX PE520 polyethylene wax (Clariant)
[24] = SUKOREZ SU 90 hydrocarbon resin (PalmerHolland, North Olmsted, Ohio)
[25] = CWP 400 polyethylene wax
[26] = MARCUS 200 crystalline polyethylene wax (Marcus Oil and Chemical, a division of HRD Corporation, Houston, Texas)
[27] = MICROSERE 195 microcrystalline wax (Ruger Chemical Co., Ltd., Irvington, Pennsylvania)
[28] = FR-6513 paraffin wax (Calumet Specialty Products Partners LP, Indianapolis, Indiana)

Examples E15-E21 and Control C13

Examples E15-E21 and Control C13 were prepared by combining the ingredients in the amounts (in % by weight) specified in Tables 7 and 8, respectively, and heating the same to from 175° C. to 190° C. with mixing. The composition of Control C13 was noted to appear slightly hazy.

Examples E15-E21 and Control 13 were then tested according to the Specific Gravity, Set Time, Viscosity and % Fiber Tear test methods under the conditions specified in Tables 7 and 8. The results are reported in Tables 7 and 8.

TABLE 7

| Sample | E15 | E16 | E17 | E18 | E19 | E20 | E21 |
|---|---|---|---|---|---|---|---|
| AFFINITY GA 1875 | 0 | 0 | 0 | 0 | 0 | 0 | 0 |
| AFFINITY GA 1900 | 10 | 30 | 30 | 40 | 30 | 25 | 35 |
| VISTAMAXX 8880 | 70 | 15 | 20 | 15 | 25 | 20 | 15 |
| ESCOREZ 5637 | 0 | 30 | 30 | 20 | 25 | 30 | 25 |
| SX-105 | 19.5 | 24.5 | 19.5 | 24.5 | 19.5 | 24.5 | 24.5 |
| IRGANOX 1010 | 0.5 | 0.5 | 0.5 | 0.5 | 0.5 | 0.5 | 0.5 |
| Specific Gravity | 0.882 | 0.942 | ND | 0.924 | ND | 0.944 | 0.934 |
| Viscosity at 149° C. (cP) | 1090 | 1300 | NT | NT | NT | 1080 | NT |
| Viscosity at 177° C. (cP) | NT | 655 | 825 | 1040 | 885 | 545 | 820 |
| Set Time (sec) at 149° C. | 1.5 | NT | NT | NT | NT | 0.7 | 1.4 |
| Set Time (sec) at 177° C. | NT | 0.9 | 1.0 | 1.5 | 1.5 | NT | 1.6 |
| % Fiber Tear | | | | | | | |
| 49° C. | 9 | 99 | 100 | 98 | 99 | 100 | 100 |
| RT (24° C.) | 50 | 100 | 100 | 100 | 100 | 100 | 100 |
| 4.5° C. | 83 | 97 | 96 | 94 | 100 | 95 | 100 |
| −18° C. | 79 | 91 | 98 | 95 | 96 | 95 | 100 |

TABLE 8

|  | C13 |
| --- | --- |
| AFFINITY GA-1875 | 52.4 |
| ESCOREZ 5637 | 4.8 |
| IRGANOX 1010 | 0.5 |
| LICOCENE PP-6102[29] | 39.5 |
| LICOCENE PE-4201[30] | 2.8 |
| Clarity in Melt | slight haze |
| Viscosity 177° C. (cps) | 1155 |
| Set Time at 177° C. (sec) | 4.4 |

[29]= LICOCENE PP 6102 = polypropylene wax having a viscosity of 60 mPas at 170° C. and a density of 0.90 g/cm³
[30]= LICOCENE PE 4201 = polyethylene wax having a viscosity of 60 mPas at 140° C. and a density of 0.97 g/cm³

Examples E22-E25

Examples E22-E25 were prepared by combining the ingredients in the amounts (in % by weight) specified in Table 9 and heating the same to from 175° C. to 190° C. with mixing.

Examples E22-E25 were then tested according to the Specific Gravity, Set Time, Viscosity and % Fiber Tear test methods under the conditions specified in Table 9. The results are reported in Table 9.

TABLE 9

| Sample | E22 | E23 | E24 | E25 |
| --- | --- | --- | --- | --- |
| AFFINITY GA 1900 | 40 | 25 | 30 | 35 |
| VISTAMAXX 8880 | 15 | 0 | 0 | 0 |
| VISTAMAXX 8780[31] | 0 | 20 | 15 | 15 |
| ESCOREZ 5637 | 20 | 30 | 30 | 25 |
| SARAWAX SX-105 | 0 | 24.5 | 24.5 | 24.5 |
| POLYWAX 3000 | 24.5 | 0 | 0 | 0 |
| IRGANOX 1010 | 0.5 | 0.5 | 0.5 | 0.5 |
| Specific Gravity | 0.927 | 0.942 | 0.941 | 0.929 |
| Viscosity at 149° C. (cP) | NT | 2035 | NT | NT |
| Viscosity at 177° C. (cP) | 1445 | 1010 | 985 | 1240 |
| Set Time (sec) at 177° C. | 1.4 | 1 | 0.8 | 1.1 |
| % Fiber Tear | | | | |
| 49° C. | NT | 99 | 99 | 98 |
| RT (24° C.) | NT | 100 | 99 | 100 |
| 4.5° C. | NT | 98 | 99 | 98 |
| −18° C. | NT | 95 | 94 | 96 |

[31]= VISTAMAXX 8780 = metallocene-catalyzed polypropylene elastomer (ExxonMobil)

Examples E26-E30

Examples E26-E30 were prepared by combining the ingredients in the amounts (in % by weight) specified in Table 10 and heating the same to from 175° C. to 190° C. with mixing.

Examples E26-E30 were then tested according to the Specific Gravity, Set Time, Viscosity and % Fiber Tear test methods under the conditions specified in Table 10. The results are reported in Table 10.

TABLE 10

|  | E26 | E27 | E28 | E29 | E30 | E31 |
| --- | --- | --- | --- | --- | --- | --- |
| AFFINITY GA 1875 | 10 | 20 | 0 | 0 | 20 | 1.5 |
| AFFINITY GA 1900 | 0 | 0 | 20 | 15 | 0 | 0 |
| VISTAMAXX 8880 | 50 | 40 | 0 | 0 | 20 | 20 |
| L-MODU S-400[32] | 0 | 0 | 40 | 45 | 20 | 25 |
| SARAWAX SX-105 | 19.5 | 19.5 | 19.5 | 19.5 | 19.5 | 19.5 |
| ESCOREZ 5637 | 20 | 20 | 20 | 20 | 20 | 20 |
| IRGANOX 1010 | 0.5 | 0.5 | 0.5 | 0.5 | 0.5 | 0.5 |
| Specific Gravity | 0.922 | 0.921 | 0.917 | 0.916 | 0.915 | 0.913 |
| Viscosity at 149° C. (cP) | 1055 | 1295 | NT | NT | NT | NT |
| Viscosity at 177° C. (cP) | NT | NT | 2410 | 2345 | 1215 | 1275 |
| Set Time (sec) at 149° C. | 0.8 | 0.8 | NT | NT | NT | NT |
| Set Time (sec) at 177° C. | NT | NT | 0.8 | 0.8 | 1.0 | 0.8 |
| PAFT (° C.) | 60.8 | 57.2 | NT | NT | NT | NT |
| % Fiber Tear | | | | | | |
| RT (24° C.) | 100 | 100 | 100 | 100 | 100 | 96 |
| 4.4° C. | 86 | 99 | 100 | 99 | 100 | 100 |
| −18° C. | 94 | 94 | 98 | 99 | 98 | 96 |
| −29° C. | 87 | 95 | 100 | 99 | 99 | 97 |

[32]L-MODU S-400 polypropylene homopolymer (Idemitsu Kosan Co., Ltd, Japan)

Other embodiments are within the claims. All documents referred to herein are incorporated to the extent they do not conflict with this application.

What is claimed is:

1. A hot melt adhesive composition comprising:
   from about 15% by weight to no greater than 75% by weight propylene polymer derived from at least 50% by weight propylene, based on the weight of the propylene polymer, and optionally an alpha-olefin comonomer other than propylene, the propylene polymer exhibiting a heat of fusion of from about 5 Joules per gram (J/g) to 60 J/g;
   from 5% by weight to about 50% by weight ethylene alpha-olefin copolymer derived from at least 50% by weight ethylene, based on the weight of the ethylene alpha-olefin polymer, and at least one alpha-olefin comonomer having at least three carbon atoms, the ethylene alpha-olefin copolymer having a density of no greater than 0.90 g/cm³;
   at least 35% by weight of a polymer selected from the group consisting of the propylene polymer, the ethylene alpha-olefin copolymer, and combinations thereof, and
   from 18% by weight to about 37% by weight of a wax component exhibiting a melting point greater than 80° C. and a heat of fusion of at least 200 J/g,
   the composition exhibiting a set time of no greater than 1.5 seconds at an application temperature of at least 149° C.

2. The hot melt adhesive composition of claim 1, wherein the propylene polymer exhibits a melt temperature of no greater than 126° C.

3. The hot melt adhesive composition of claim 1, wherein the propylene polymer exhibits a melt temperature of no greater than 120° C.

4. The hot melt adhesive composition of claim 1, wherein the propylene polymer exhibits a melt temperature of no greater than 110° C.

5. The hot melt adhesive composition of claim 1, wherein the wax is selected from the group consisting of Fischer Tropsch wax, polyethylene wax, and combinations thereof.

6. The hot melt adhesive composition of claim 1, wherein the wax component comprises at least 15% by weight, based on the weight of the adhesive composition, of a wax that exhibits a melting point greater than 80° C. and a heat of fusion of at least 200 J/g and is selected from the group consisting of Fischer Tropsch wax, polyethylene wax, and combinations thereof.

7. The hot melt adhesive composition of claim 1 comprising from about 10% by weight to about 35% by weight of the ethylene alpha-olefin copolymer.

8. The hot melt adhesive composition of claim 1, wherein the hot melt adhesive composition comprises
from about 15% by weight to about 55% by weight of the propylene polymer,
from about 10% by weight to about 32% by weight of the ethylene alpha-olefin copolymer, and
from about 19% by weight to about 35% by weight of the wax component, and
further comprises from about 10% by weight to about 35% by weight tackifying agent.

9. The hot melt adhesive composition of claim 1, wherein the hot melt adhesive composition comprises
from about 15% by weight to about 50% by weight of the propylene polymer,
from about 10% by weight to about 30% by weight of the ethylene alpha-olefin copolymer, and
from 25% by weight to about 35% by weight of the wax component, and
further comprises from about 15% by weight to about 35% by weight tackifying agent.

10. The hot melt adhesive composition of claim 9, wherein the tackifying agent has a Ring and Ball softening point of at least 120° C.

11. The hot melt adhesive composition of claim 1, wherein the hot melt adhesive composition exhibits a specific gravity of no greater than 0.93.

12. The hot melt adhesive composition of claim 3, wherein the hot melt adhesive composition comprises
from about 15% by weight to about 70% by weight of the propylene polymer,
from about 10% by weight to about 35% by weight of the ethylene alpha-olefin copolymer, and
from about 19% by weight to about 35% by weight of the wax component.

13. The hot melt adhesive composition of claim 1, wherein the hot melt adhesive exhibits a set time of no greater than 1.0 second at an application temperature of at least 135° C.

14. The hot melt adhesive composition of claim 1, wherein the hot melt adhesive exhibits a set time of no greater than 0.8 seconds at an application temperature of at least 135° C.

15. The hot melt adhesive composition of claim 1, wherein the hot melt adhesive exhibits a set time of no greater than 0.7 seconds at an application temperature of at least 135° C.

16. The hot melt adhesive composition of claim 1, wherein the hot melt adhesive exhibits a peel adhesion failure temperature of at least 50° C.

17. The hot melt adhesive composition of claim 1, wherein the propylene polymer exhibits a Tg no greater than 0° C.

18. The hot melt adhesive composition of claim 1, wherein the hot melt adhesive composition exhibits at least 50% fiber tear at −43° C. and at least 50% fiber tear at 55° C.

19. The hot melt adhesive composition of claim 1, comprising from 10% by weight to 20% by weight of the ethylene alpha-olefin copolymer.

20. The hot melt adhesive composition of claim 1, wherein the propylene polymer comprises a propylene-alpha olefin polymer derived from at least 50% by weight propylene, based on the weight of the propylene polymer, and from about 1 mole % to about 37.5 mole % of an alpha-olefin comonomer, based on the molar mass of the propylene polymer.

21. An article comprising:
a first substrate;
the hot melt adhesive composition of claim 1; and
a second substrate bonded to the first substrate through the adhesive composition.

22. A hot melt adhesive composition comprising:
from about 15% by weight to no greater than 75% by weight propylene polymer derived from at least 50% by weight propylene, based on the weight of the propylene polymer, and optionally an alpha-olefin comonomer other than propylene, the propylene polymer exhibiting a heat of fusion of from about 5 J/g to 60 J/g and a melt temperature of no greater than 120° C.;
from 5% by weight to about 50% by weight ethylene alpha-olefin copolymer derived from at least 50% by weight ethylene, based on the weight of the ethylene alpha-olefin polymer, and at least one alpha-olefin comonomer having at least three carbon atoms, the ethylene alpha-olefin copolymer having a density of no greater than 0.90 g/cm$^3$;
at least 35% by weight of a polymer selected from the group consisting of the propylene polymer, the ethylene alpha-olefin copolymer, and combinations thereof, and
from at least 15% by weight to about 37% by weight of at least one wax that exhibits a melting point greater than 80° C. and a heat of fusion of at least 200 J/g, the at least one wax being selected from the group consisting of Fischer Tropsch wax, polyethylene wax, and combinations thereof,
the composition exhibiting a set time of no greater than 1.5 seconds at an application temperature of at least 149° C.

23. The hot melt adhesive composition of claim 22, wherein the propylene polymer comprises a propylene-alpha olefin polymer derived from at least 50% by weight propylene, based on the weight of the propylene polymer, and from about 1 mole % to about 37.5 mole % of an alpha-olefin comonomer, based on the molar mass of the propylene polymer.

* * * * *